Jan. 24, 1928.

E. H. ADAMS 1,657,334

SHAVING MIRROR

Filed Dec. 27, 1926

INVENTOR.
Ernest H. Adams
by H. L. Kirkpatrick
his attorney

Jan. 24, 1928.

E. H. ADAMS 1,657,334

SHAVING MIRROR

Filed Dec. 27, 1926

INVENTOR.
Ernest H. Adams
by H. L. Kirkpatrick
his attorney

Patented Jan. 24, 1928.

1,657,334

UNITED STATES PATENT OFFICE.

ERNEST H. ADAMS, OF SAN FRANCISCO, CALIFORNIA.

SHAVING MIRROR.

Application filed December 27, 1926. Serial No. 157,221.

This invention relates to improvements in mirrors for shaving and the like and has for its object to provide a novel and superior illuminating mirror device for such purposes in which the source of light is so located and the light so diffused and projected as to illuminate the entire face with an entire absence of glare and without shadows. In this construction a diffused beam of light is thrown directly on the face of the user and from there reflected in the mirror, the mirror and source of light being so associated, mounted and held by novel means as to permit ready positioning and adjustment.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the drawings in which like numerals represent like parts:

Referring to the drawings:—

1 designates generally a mirror having an unsilvered portion designated at 2.

Figure 1:
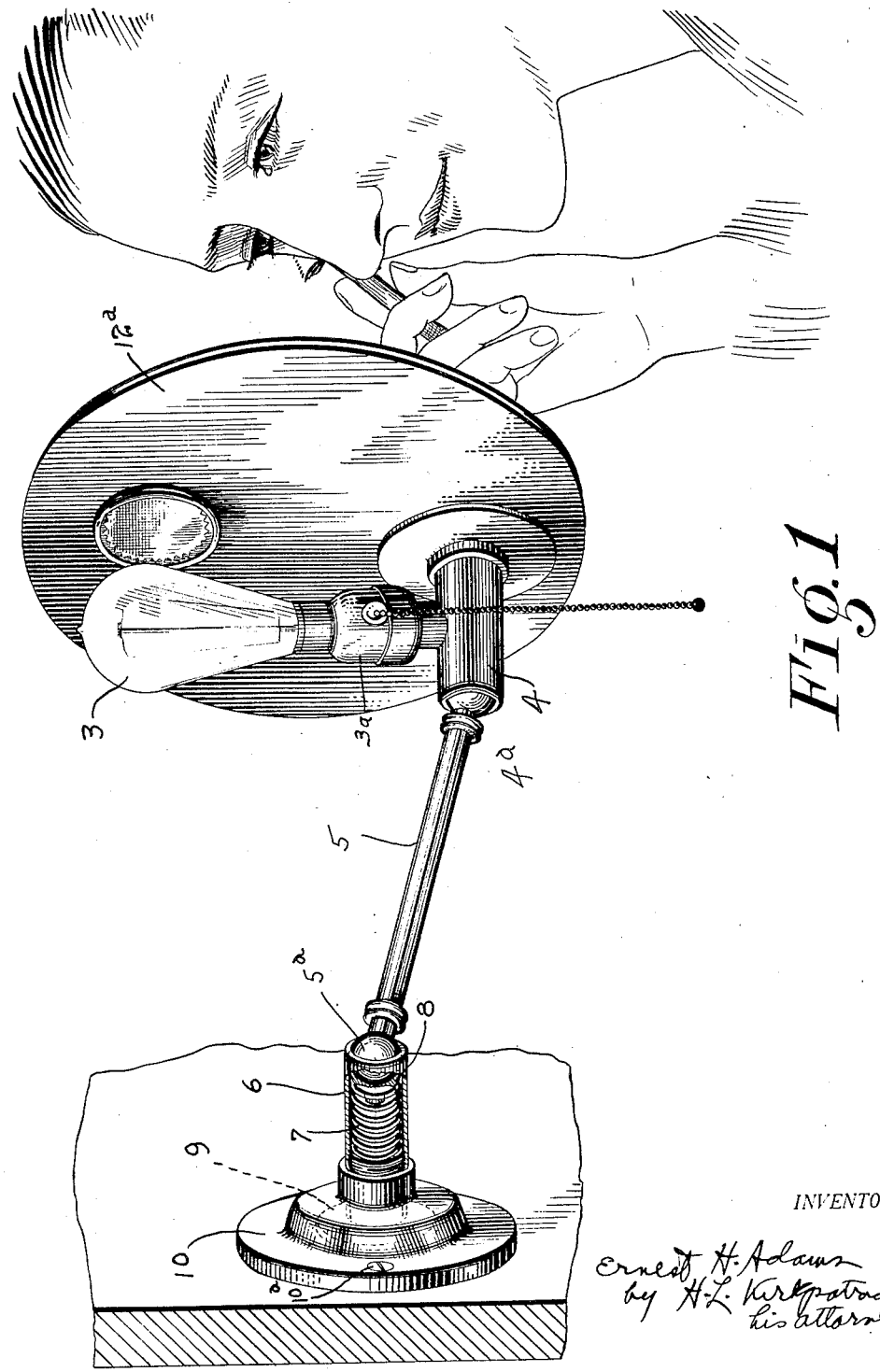
Fig. 1 is a perspective view, partly in section, illustrating the device and its use.
Figure 2:
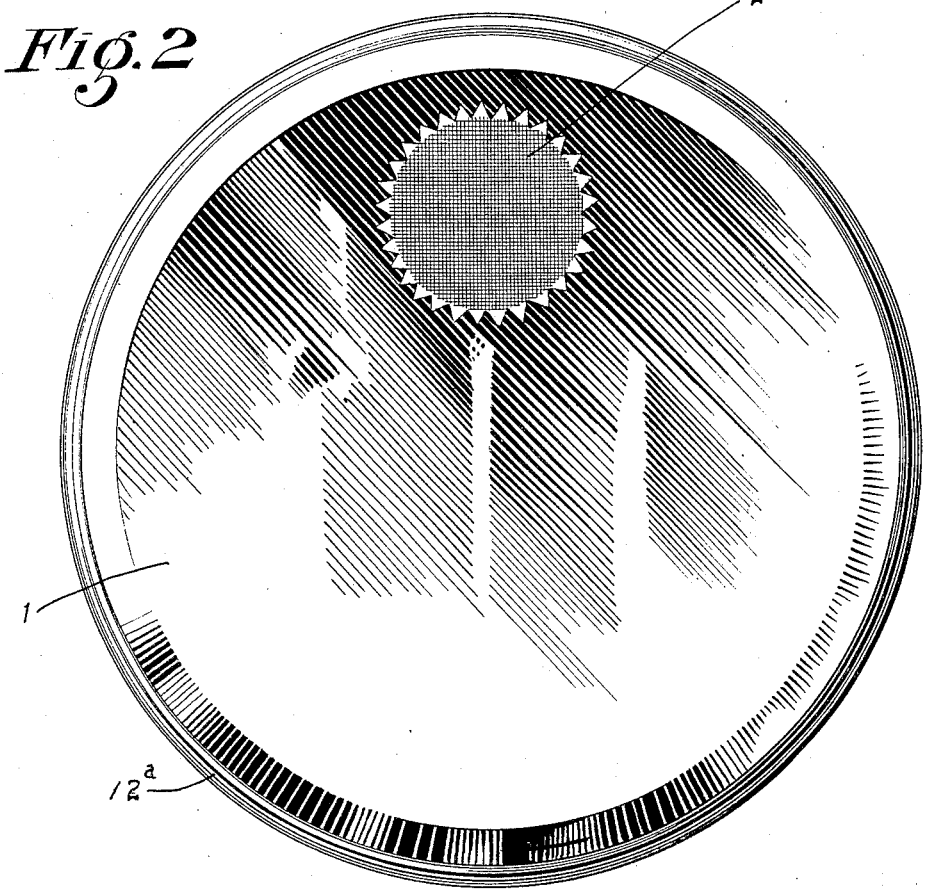
Fig. 2 is a front elevation of the device.
Figure 3:
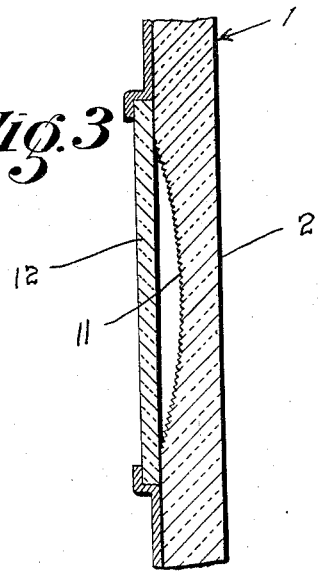
Fig. 3 is an enlarged cross-sectional view showing the prismatic light diffusing portion and the dust cover affixed thereto.
Figure 4:
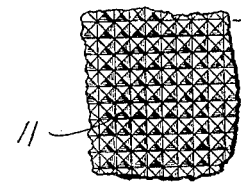
Fig. 4 is an enlarged elevation of a fragment of the preferred light diffusing media.

3 an electric lamp suitably held in a socket 3ª in the rear of the mirror 2 being affixed, for example as by a bracket 4 which is attached to the metallic mirror housing 12ª. The mirror and lamp assembly is adjustably affixed by a ball and socket joint 4ª to a bracket arm 5 which is in turn adjustably held by a slotted ball and socket joint 5ª in the wall-bracket 6. Provision is made for adjusting the tension at the ball and socket joint 5ª by means of a spring 7 which bears against a slidable cup 8, the pressure upon the spring being controlled by the member 9 which screws into the bracket 6. The flange 10 may be affixed to the wall as by screws 10ª as shown, or the member 9 may, if desired, be screwed to the wall and the flange held to the bracket 6 by a set screw (not shown) as is common in electric light fixtures. The movement of the ball and socket joints 4ª and 5ª is limited so as to prevent the rotation of the arm 5 and mirror bracket 4. A light diffusing media, preferably a prismatic portion ground in the rear face of the mirror 1, as shown in Fig. 3. This portion is covered by a glass plate 12 serving as a dust cover to keep the prismatic portion free from dirt, etc. I prefer to have the diffusing media integral with and in the mirror as shown though as an alternative, the mirror may be plain and the light diffusing media ground in the adjacent face of the plate 12. The glass plate 12 is held to the rear face of the mirror by a flange on the metallic backing 12ª which encloses the beveled edge of the mirror and holds the mirror in correct position with reference to the mirror bracket 4.

This device has proved to be of marked utility in that the mirror is readily adjustable to any desired position and the diffused rays of light come from within the confines of the mirror, nearly all of the face of which is effective and available for use as the rays of light are so diffused and broken up that it does not bother the eyes of the person using the same nor prevent him from seeing reflections in the mirror even though the reflections be adjacent the portion through which the light comes.

Having described my invention what I wish to claim and secure by Letters Patent is:—

1. A shaving mirror or the like having, in combination, a wall bracket, a mirror adjustably held by said bracket, said mirror having in its back surface an unsilvered prismatic light diffusing portion integral therewith, a covering for said portion, and an electric lamp mounted rearwardly of said light diffusing portion adapted to shed a beam of light therethrough.

2. In an article of manufacture comprising a shaving mirror or the like, an adjustable wall bracket with an arm with slotted ball and socket jointed thereto, a mirror adjustably mounted on said arm by a slotted ball and socket joint, said mirror having in its back surface an unsilvered prismatic light diffusing portion, a covering for said portion, and an electric lamp mounted on said bracket rearwardly of said light diffusing portion adapted to shed a beam of light therethrough.

ERNEST H. ADAMS.